(12) United States Patent
Dietz (10) Patent No.: US 7,707,971 B2
(45) Date of Patent: May 4, 2010

(54) MULTIPLE FUNCTION ANIMAL FURNITURE SYSTEM

(76) Inventor: Dan Dietz, 10234 Emerald Dr., Houston, TX (US) 77074

( * ) Notice: Subject to any disclaimer, the term of this patent is extended or adjusted under 35 U.S.C. 154(b) by 774 days.

(21) Appl. No.: 11/456,817

(22) Filed: Jul. 11, 2006

(65) Prior Publication Data

US 2007/0163510 A1 Jul. 19, 2007

Related U.S. Application Data (63) Continuation-in-part of application No. 11/563,650, filed on Nov. 27, 2006, which is a continuation-in-part of application No. 11/459,868, filed on Jul. 25, 2006, which is a continuation-in-part of application No. 11/456,817, filed on Jul. 11, 2006, which is a continuation-in-part of application No. 11/455,489, filed on Jun. 19, 2006, which is a continuation-in-part of application No. 11/438,040, filed on May 19, 2006, which is a continuation-in-part of application No. 11/287,716, filed on Nov. 28, 2005, now Pat. No. 7,234,415, which is a continuation-in-part of application No. 11/121,797, filed on May 4, 2005, now Pat. No. 7,237,506.

(51) Int. Cl.
*A01K 1/03* (2006.01)

(52) U.S. Cl. ............ 119/452; 119/470; 52/DIG. 4

(58) Field of Classification Search .......... 119/452, 119/461, 470, 474, 481, 482, 498, 500; 52/DIG. 4
See application file for complete search history.

(56) References Cited

U.S. PATENT DOCUMENTS

| | | | |
|---|---|---|---|
| 2,532,863 A | 12/1950 | Taylor | |
| 2,579,797 A | 12/1951 | Churchfield et al. | |
| 2,760,275 A * | 8/1956 | Stein | 434/73 |
| 3,234,908 A | 2/1966 | Doskocil | |
| 3,618,568 A | 11/1971 | Breeden | |
| 4,224,899 A | 9/1980 | Cruchelow et al. | |
| 4,253,204 A | 3/1981 | Tasaka | |
| 4,334,501 A | 6/1982 | McDaniel et al. | |
| 4,347,807 A | 9/1982 | Reich | |
| 4,416,493 A * | 11/1983 | Sumner | 312/245 |
| 4,471,548 A * | 9/1984 | Goudie | 40/610 |
| D288,970 S | 3/1987 | Runion | |
| 4,719,656 A | 1/1988 | Godinet | |

(Continued)

OTHER PUBLICATIONS

Notice of Allowance for U.S. Appl. No. 11/121,797 dated Mar. 16, 2007.

(Continued)

*Primary Examiner*—Rob Swiatek
(74) *Attorney, Agent, or Firm*—Daniel N. Lundeen; Lundeen & Lundeen PLLC (57) ABSTRACT

An animal housing. In an embodiment, the animal housing includes a top side, wherein the top side comprises open and closed positions. The animal housing also includes a plurality of sides. The plurality of sides provide support to the top side. In addition, the plurality of sides comprise a front side comprising a front side opening. Moreover, the animal housing includes a front side grate. The front side grate is vertically moveable with the top side in the closed position.

18 Claims, 12 Drawing Sheets

U.S. PATENT DOCUMENTS

| | | | |
|---|---|---|---|
| 4,838,204 A * | 6/1989 | Young | 119/471 |
| 5,148,768 A | 9/1992 | Hinton | |
| 5,211,130 A | 5/1993 | Elias et al. | |
| D369,885 S | 5/1996 | Zeiler | |
| 5,623,801 A * | 4/1997 | Drumbl | 52/514 |
| 5,662,065 A | 9/1997 | Bandimere et al. | |
| 5,765,505 A | 6/1998 | Yun | |
| 5,778,822 A | 7/1998 | Giffin et al. | |
| 6,189,487 B1 | 2/2001 | Owen et al. | |
| 6,267,082 B1 | 7/2001 | Naragon et al. | |
| 6,295,950 B1 | 10/2001 | Deitrich et al. | |
| 6,490,995 B2 | 12/2002 | Greene, Jr. | |
| 6,588,366 B1 | 7/2003 | Ranson et al. | |
| 6,748,895 B2 | 6/2004 | Besenzoni | |
| 6,763,784 B1 * | 7/2004 | Liu | 119/452 |
| 2002/0152969 A1 | 10/2002 | Grigsby et al. | |
| 2003/0066489 A1 | 4/2003 | Whitehill | |
| 2004/0134433 A1 | 7/2004 | Holder | |
| 2004/0177814 A1 | 9/2004 | Godshaw | |
| 2005/0279286 A1 | 12/2005 | Youngmark | |
| 2006/0042548 A1 | 3/2006 | Tharalson et al. | |
| 2006/0112897 A1 | 6/2006 | Moore | |
| 2006/0118051 A1 | 6/2006 | Lima | |

OTHER PUBLICATIONS

Office Action for U.S. Appl. No. 11/121,797 dated Dec. 12, 2006.
Office Action for U.S. Appl. No. 11/121,797 dated Aug. 21, 2006.
Notice of Allowance for U.S. Appl. No. 11/287,716 dated Mar. 16, 2007.
Office Action for U.S. Appl. No. 11/287,716 dated Dec. 29, 2006.
Office Action for U.S. Appl. No. 11/287,716 dated Sep. 8, 2006.
PCT International Search Report for International Application No. PCT/US2006/017361 dated Sep. 12, 2006 (2 p.).
PCT International Search Report for International Application No. PCT/US2006/017029 dated Sep. 15, 2006 (2 p.).
PCT International Search Report for International Application No. PCT/US2006/017011 dated Sep. 11, 2006 (2 p.).

* cited by examiner

MULTIPLE FUNCTION ANIMAL FURNITURE SYSTEM

CROSS-REFERENCE TO RELATED APPLICATIONS

This application is a continuation-in-part application of U.S. application Ser. No. 11/563,650 filed on Nov. 27, 2006, which is a continuation-in-part application of U.S. application Ser. No. 11/459,868 filed on Jul. 25, 2006, which is a continuation-in-part application of U.S. application Ser. No. 11/456,817 filed on Jul. 11, 2006, which is a continuation-in-part application of U.S. application Ser. No. 11/455,489 filed on Jun. 19, 2006, which is a continuation-in-part application of U.S. application Ser. No. 11/438,040 filed on May 19, 2006, which is a continuation-in-part application of U.S. application Ser. No. 11/287,716 filed on Nov. 28, 2005, now U.S. Pat. No. 7,234,415, which is a continuation-in-part application of U.S. application Ser. No. 11/121,797 filed on May 4, 2005, now U.S. Pat. No. 7,237,506, which are each herein incorporated by reference in their entirety.

STATEMENT REGARDING FEDERALLY SPONSORED RESEARCH OR DEVELOPMENT

Not applicable.

BACKGROUND OF THE INVENTION

1. Field of the Invention

This invention relates to furniture for an animal and in particular to a piece of furniture that has multiple configurations and can function in multiple ways to accommodate various desires of the animal at any stage of growth. More particularly, this furniture structure and system may function as a living quarters for smaller animals such as puppies during house training periods, a storage location for objects related to the animal, as an animal bed, a sitting bench for humans or animals, and/or as an animal step for getting into a human bed.

2. Background of the Invention

For many people, pet animals are members of the family. Some of these pets live inside the home with the owner and have accessories designed for the animal. As with the conventional dog houses, some of the furnishings provide a place for the animal to dwell as well as providing a storage place for the toys of the animal. One conventional piece of animal furniture is a bed. There have been many types of animal beds, which are available in various designs. Some of the designs include beds shaped as different types of animals. Many beds in the form of animal designs are made of a cushion material to facilitate animal comfort.

One animal bed is disclosed in U.S. Pat. No. 5,662,065, which describes an animal bed that has an annual bed frame defining an interior chamber. A perforated top wall is supported at its periphery by the bed frame to receive and support the animal above the chamber. The perforated top wall is composed of a non-woven fabric material to provide a hammock-like suspension for the animal and to permit small insects to fall through the top wall. The chamber is dimensioned to provide a space below the top wall sufficient to inhibit the insects from traveling upwardly through the top wall. An insect exterminating composition contained within the chamber receives the falling insects and destroys them.

U.S. Pat. No. d 288,970 describes a combined animal bed and housing unit. This design has a bed mat resting on a storage unit. The bed also has a canopy covering the mat. The animal may rest on the mat and may be covered by the canopy.

Although the animal bed is a common piece of furniture for the inside pet, animals do more than just sleep. For instance, cats usually have a litter box for waste. Pets also have toys with which they play. In addition, some pets may prefer to climb on the owner's bed. The animal may climb because the animal may not jump high enough to reach the surface of the bed in one jump. The climbing process may result in the pet pulling and sometimes tearing the bed linen. Pets also typically do not stay the same size. As the pet grows, it may be desired to replace a piece of animal furniture with a different type of furniture or a larger size of the same furniture.

With all of the different types of animal furniture that is available to accommodate the many needs of the pet and pet owner, there remains a need for a multiple function piece of animal furniture.

BRIEF SUMMARY OF SOME OF THE PREFERRED EMBODIMENTS

These and other needs in the art are addressed by an animal housing that comprises a cage and a base. The animal housing further comprises an outer covering comprising a plurality of outer covering sides, wherein the outer covering comprises a first outer covering side secured to a second outer covering side by a magnet.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS The multiple function animal furniture piece provides an animal owner with a system they may use for an animal throughout the life of the animal. The multiple function animal furniture piece may serve as a training cage to train small animals such as puppies for living indoors. A detachable mat on the floor of the multiple function animal furniture piece provides for ease in cleaning animal waste. A removable front cover such as a grill may restrict undesired movement of the animal in and out of the furniture piece. In addition, as an animal gets older and/or bigger, the animal may no longer dwell inside the multiple function animal furniture piece. At this point, the multiple function animal furniture piece may function as a storage structure. Moreover, the multiple function animal furniture piece may have an attachable ramp member for use by an animal to climb to the top of the multiple function animal furniture piece structure. This ramp may be useful for smaller and older animals. The ramp may be stored inside the multiple function animal furniture piece when the ramp is not in use. The multiple function animal furniture piece may be portable and may be positioned adjacent the owner's bed. In this arrangement, the animal may easily move to the owner's bed. Further, the owner may easily sit on the top of the multiple function animal furniture piece. When an animal dies, the structure may be converted into a container (e.g., coffin) for burying the deceased animal.

Figure 1:
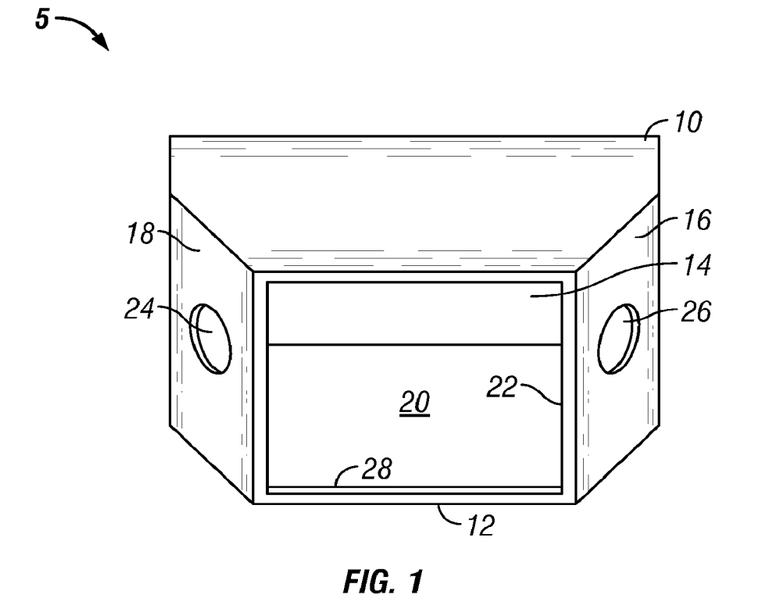
FIG. 1 illustrates a front, top and side view of the multiple function animal furniture piece.

FIG. 1 shows a general design of the multiple function animal furniture piece 5. Other configurations such as those described in U.S. patent application Ser. No. 11/121,797 to the same inventor may be implemented to achieve the same results as the design described in FIG. 1. As shown, multiple function animal furniture piece 5 has a top 10, open front side 12, a back side 14, and multiple side walls 16 and 18. The number of sides may vary with the particular design shape. Multiple function animal furniture piece 5 may also contain a floor 20. The front side 12 has an opening 22, which covers a large portion of the front side 12. This large opening 22 allows for animals to enter multiple function animal furniture piece 5. Without limitation, the opening 22 may also allow for insertion of toys, food and water trays into the multiple function animal furniture piece 5. In addition, smaller openings 24 and 26 may be disposed in the side walls 16, 18. Without limitation, these openings 24, 26 may improve ventilation in multiple function animal furniture piece 5. The front side 12 also has a lip 28 that extends up from the base. Without limitation, lip 28 may prevent toys such as balls from accidentally rolling out of the multiple function animal furniture piece 5. In addition, a lip section (not illustrated) may also be attached to the top 10. Without limitation, such a lip section may serve as a restraining means to stabilize and keep a cushion stationary when an animal is resting on it.

It is to be understood that side walls 16, 18 may have one or more than one opening, respectively, and that side walls 16, 18 are shown in FIG. 1 with each side wall 16, 18 having one opening each (openings 24, 26) for illustration purposes only. It is also to be understood that back side 14 may have no such openings or one or more such openings. In an alternative embodiment, one or more of the sides may have no such openings. Openings in side walls 16, 18 and back side 14 may have any shape, configuration, and size suitable for allowing ventilation and visibility into and out of multiple function animal furniture piece 5. For instance, such openings may have the shape of characters such as animals, cartoon figures, toys, lettering, numbering, symbols, and the like. Without limitation, examples of animal shapes include dogs, cats, and the like. In addition, without limitation, examples of cartoon figures include MICKEY MOUSE (which is a mark owned by Disney Enterprises, Inc.), SUPERMAN (which is a mark owned by DC Comics Warner Communications Inc.), and the like. Examples of toys include, without limitation, trucks, cars, airplanes, and the like. The character shape openings may be applied to the sides by any suitable process such as by a cutting apparatus, press, or the like.

Multiple function animal furniture piece 5 may be composed of any material suitable for the uses of multiple function animal furniture piece 5. For instance, multiple function animal furniture piece 5 may include wood, mesh, wire, plastic, metal, and the like. In such an embodiment, back side 14 and/or multiple side walls 16 and 18 may comprise wire, mesh, netting, weaving, and the like, preferably wire or mesh, and more preferably wire or wire-like material. Moreover, back side 14 and/or multiple side walls 16 and 18 may be composed of any porous material suitable for use as a side in an animal cage (e.g., porous metal or plastic siding). In an embodiment, back side 14 and/or multiple side walls 16 and 18 are composed of a plastic, wood, metal, or the like wire or wire-like material. One or more of multiple side walls 16 and 18 (preferably both side walls 16, 18) may be composed of such materials. In an embodiment (not illustrated), an outer covering may be disposed on the outside and/or inside surface of one or more of any side (e.g., front side 12, back side 14, side walls 16 and 18, top 10, floor 20) preferably an outer covering is disposed on the outside surface. In some embodiments, an outer covering is disposed on the outside surface of multiple side walls 16 and 18, back side 14 and/or top 10. The outer covering may cover any desired portion of a side. In addition, the outer covering may comprise any suitable covering for use with animals. For instance, the outer covering may be composed of natural or synthetic woods, veneers, vinyl, wicker, plastic, ceramic, and the like. In an embodiment top 10 and/or front side 12 may also be composed of such plurality of openings and/or alternatively may also include such an outer covering. In alternative embodiments, at least one side and/or wall of multiple function animal furniture piece 5 comprises a substantially solid material.

Figure 2:
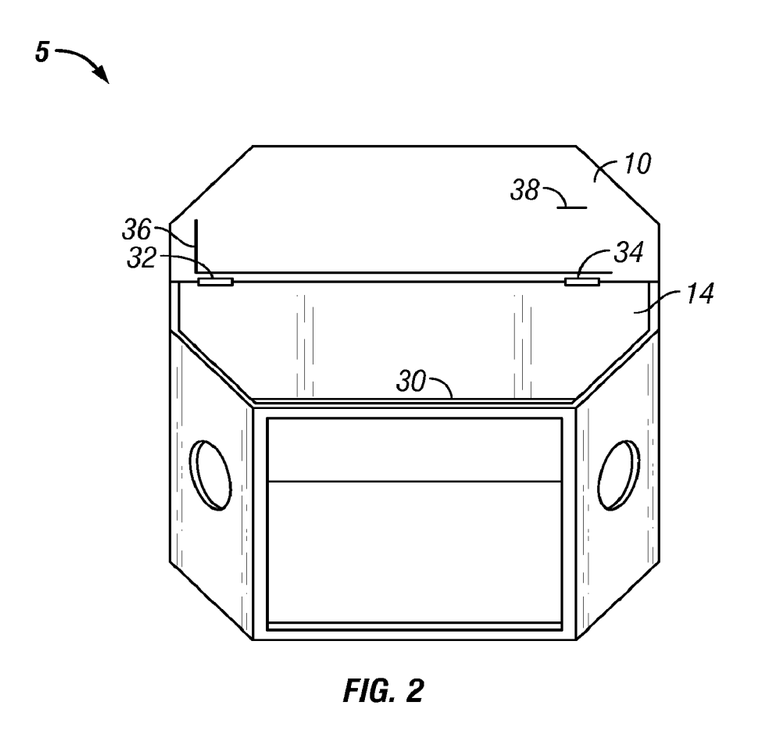
FIG. 2 illustrates a view of the multiple function animal furniture piece with the top extended up to open the furniture piece.

FIG. 2 shows the multiple function animal furniture piece 5 with the top 10 extended in an upward position, which thereby opens up multiple function animal furniture piece 5. As shown, a bar 30 extends across the front side of multiple function animal furniture piece 5 and may serve as a rest bar for the top 10. Hinges 32 and 34 attach the top 10 to the back side 14 and allow the top 10 side to open and close as desired. Attached to the inside surface of the top 10 side is a rack member 36 for holding a ramp member when the ramp member is not in use. Rack member 36 may have any suitable shape (e.g., an L-shape) that fits with the shape of a rectangular ramp member. In an embodiment, rack member 36 is a groove with a generally u-shape in which the ramp member is placed. When the ramp member is placed in rack member 36, a latch 38 secures the ramp in rack member 36.

Figure 3:
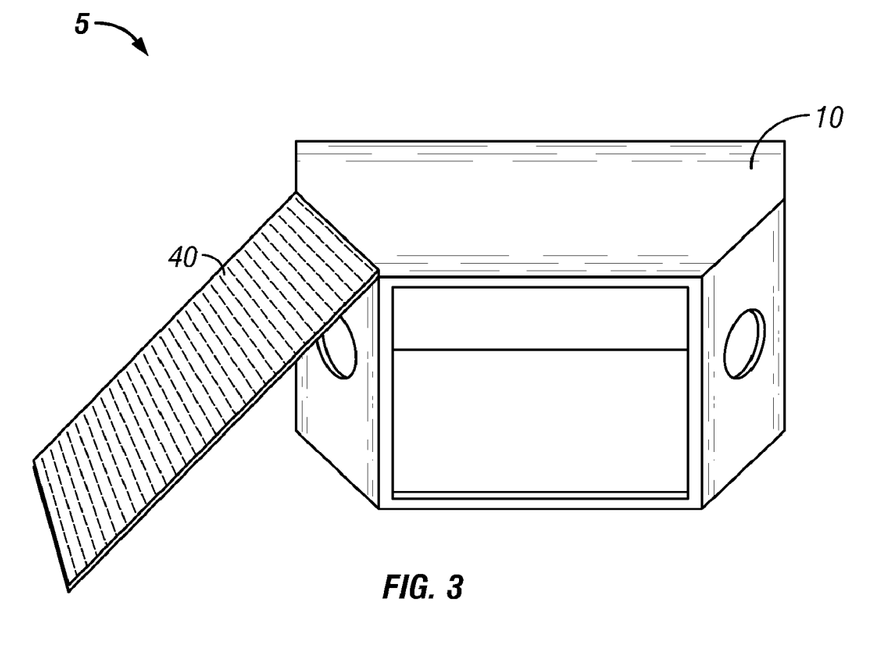
FIG. 3 illustrates a view of the multiple function animal furniture piece with a ramp member extended from the furniture piece.

FIG. 3 shows a configuration of the multiple function animal furniture piece 5 with a detachable ramp 40 engaged at one side. In this configuration, an animal may climb to the top 10 of multiple function animal furniture piece 5 without the need to climb up on a bed or other piece of furniture. Depending on the height of multiple function animal furniture piece 5, the length of the ramp 40 may vary such that the inclination angle formed by the engagement of the ramp 40 to multiple function animal furniture piece 5 is not too steep for the animal to safely climb.

Figure 4:
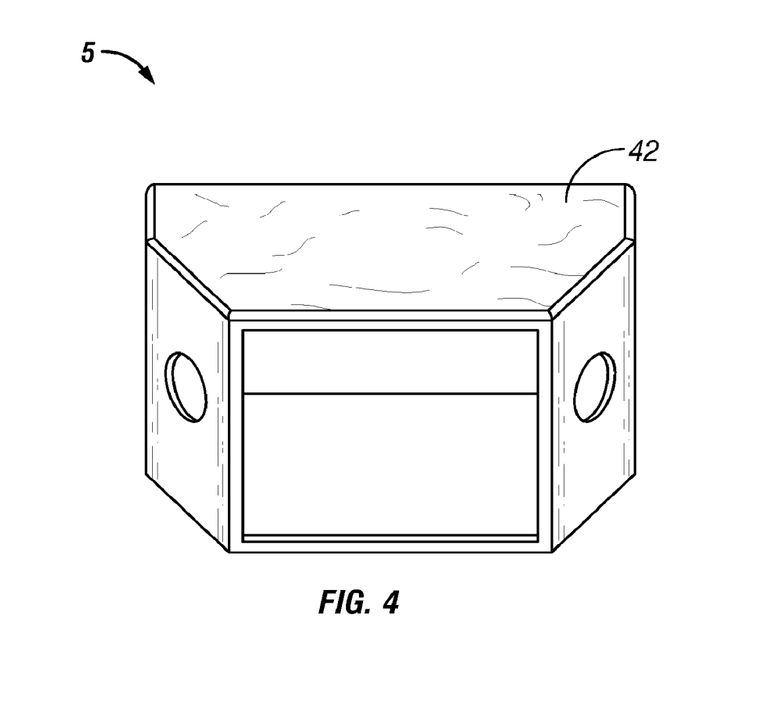
FIG. 4 illustrates an embodiment of the multiple function animal furniture piece with a cushion material positioned on the top on which an animal may rest or sleep.
Figure 9:
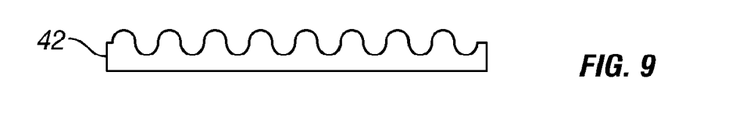
FIG. 9 illustrates a cross-section view of the cushion material positioned on the top of the furniture piece.

FIG. 4 shows the multiple function animal furniture piece 5 with the cushion material 42 positioned on the top 10. As mentioned, the cushion material 42 may serve as a cushion on which an animal may rest or sleep. FIG. 9 shows the cross-section of a typical cushion that may be used with multiple function animal furniture piece 5. Other types of cushions with varying shapes may also be implemented in a similar manner.

Figure 5:
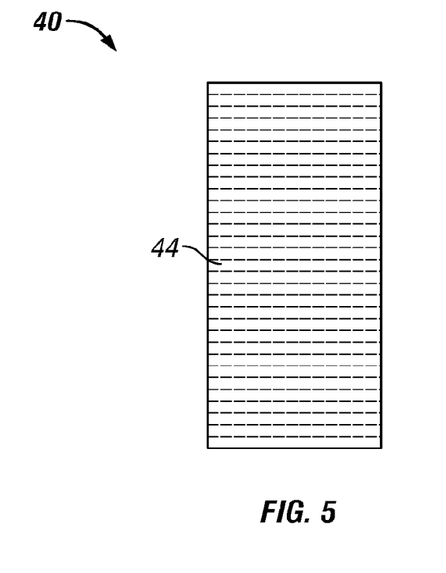
FIG. 5 illustrates a frontal side view of the ramp member.
Figure 6:
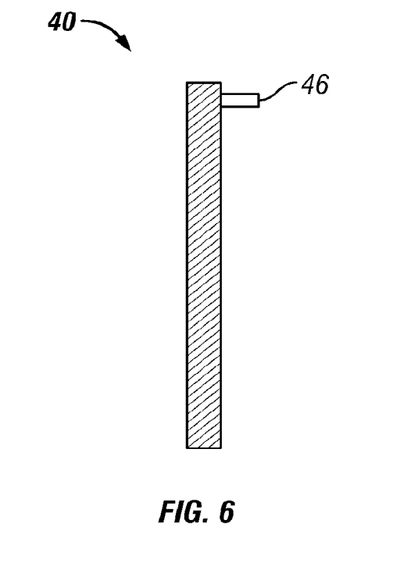
FIG. 6 illustrates a side cross-sectional view of the ramp member showing a lip used to enable the ramp member to engage the furniture piece.

FIG. 5 shows a front view of the ramp member 40. Attached to this front side is a fiber-type material 44 such as a cloth or carpet material. Fiber-type material 44 increases the friction of the ramp member 40 such that an animal may have improved traction as the animal climbs the ramp member 40 to the top 10. FIG. 6 shows a side cross-sectional view of the ramp member 40. The ramp member 40 contains a lip 46 that engages the edge of the top side securing the ramp member 40 to multiple function animal furniture piece 5.

Figure 7:
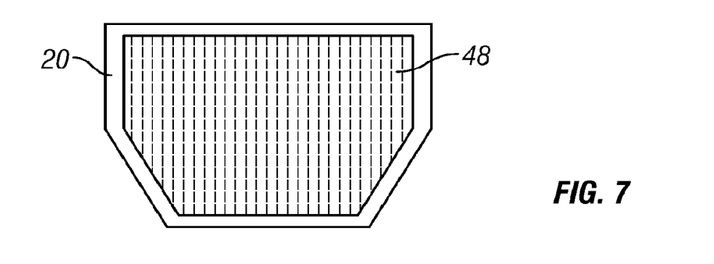
FIG. 7 illustrates a view down on the floor mat positioned on the furniture piece.
Figure 8:
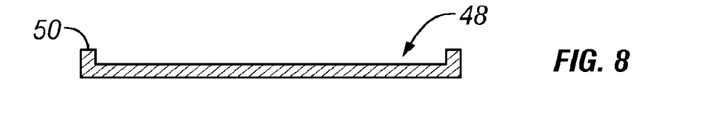
FIG. 8 illustrates a side cross-section view of the floor mat.

FIG. 7 shows a view of the floor 20 of multiple function animal furniture piece 5 covered by a mat material 48. Mat material 48 may be an elastic or rubber type of material or other type of water-proof material. The mat material 48 extends up the side walls of multiple function animal furniture piece 5 thereby covering substantially all of the floor 20. This mat material 48 provides a way to easily clean multiple function animal furniture piece 5. As mentioned, multiple function animal furniture piece 5 may serve as a house for a smaller pet. Typically, these pets are initially not house trained. Any waste secreted by the animal may not penetrate to the floor. When cleaning, the owner may raise the top 10 of multiple function animal furniture piece 5 and remove the mat material 48. The owner may then clean the mat material 48. FIG. 8 shows the cross-section of the mat material 48. The edge 50 of the mat 48 has a lip shape that prevents substances from escaping the mat material 48 surface. The mat material 48 may also have a ridged surface similar to FIG. 9 for channeling liquid.

Figure 10:
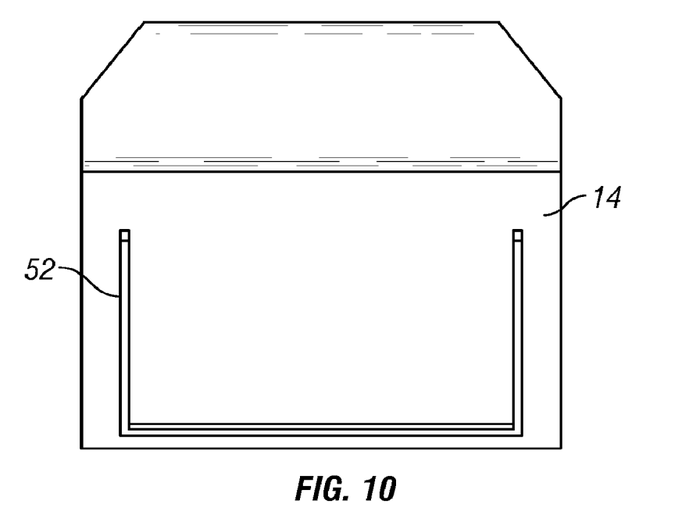
FIG. 10 illustrates a view of the back side of the furniture piece showing a rack means used to store a grate or screen.
Figure 11:
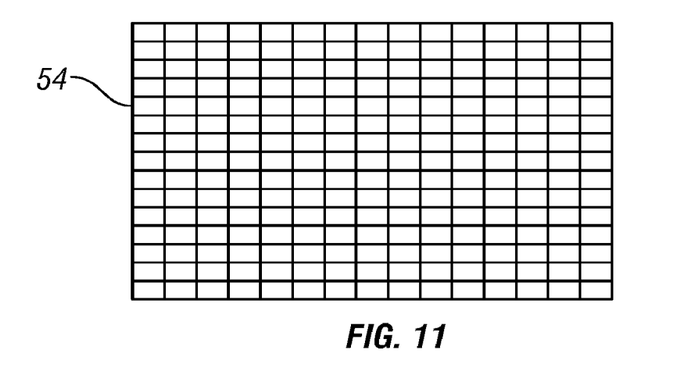
FIG. 11 illustrates a design of a detachable grate used to cover the front opening of the furniture piece.
Figure 12:
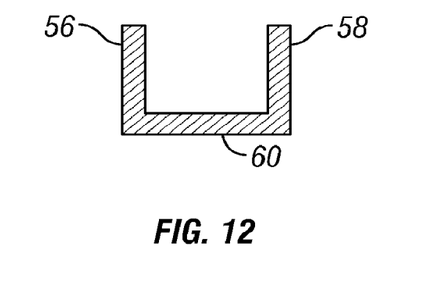
FIG. 12 illustrates a cross-section view of the guide used for storing the grate.

FIG. 10 shows the back side 14 of multiple function animal furniture piece 5. Attached to this back side 14 is a storage rack 52 similar to the rack member 36. Without limitation, storage rack 52 may hold grate 54, which is shown in FIG. 11. Storage rack 52 has a general shape that matches the shape of the grate 54. FIG. 12 shows a cross-section of the storage rack 52. Storage rack 52 has two sides 56 and 58 and a base 60. The two sides 56, 58 are perpendicularly attached to the base 60. One side is also attached to the back side 14. When the grate 54 is not in use, grate 54 may be slid into storage rack 52. Grate 54 may be used to cover front opening 22. Grate 54 may have different designs and may also be composed of screen material. In addition, other conventional materials such as plastic may be used as this front opening 22 cover.

Figure 13:
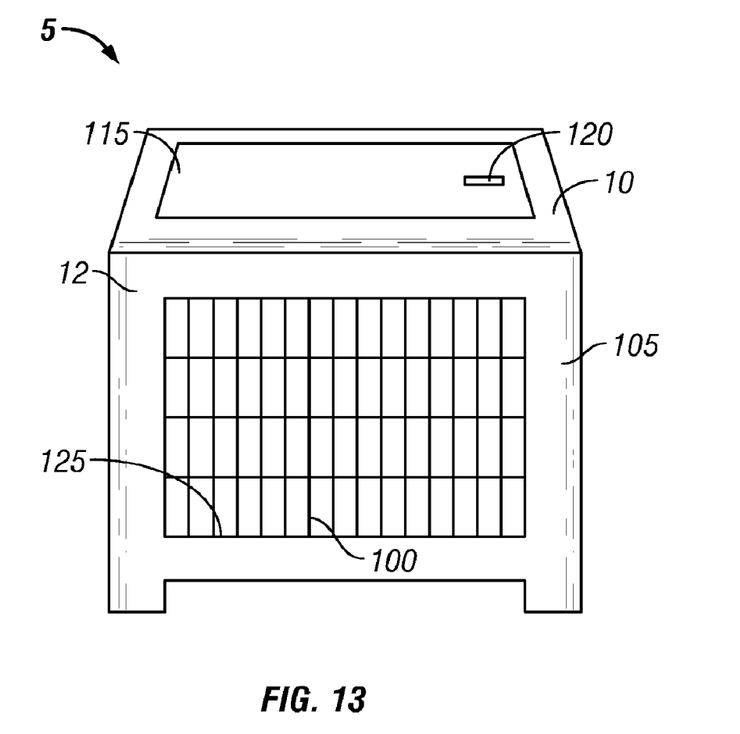
FIG. 13 illustrates a front view of a multiple function animal furniture piece showing a front and stop side and having a cage and an outer covering.
Figure 14A:
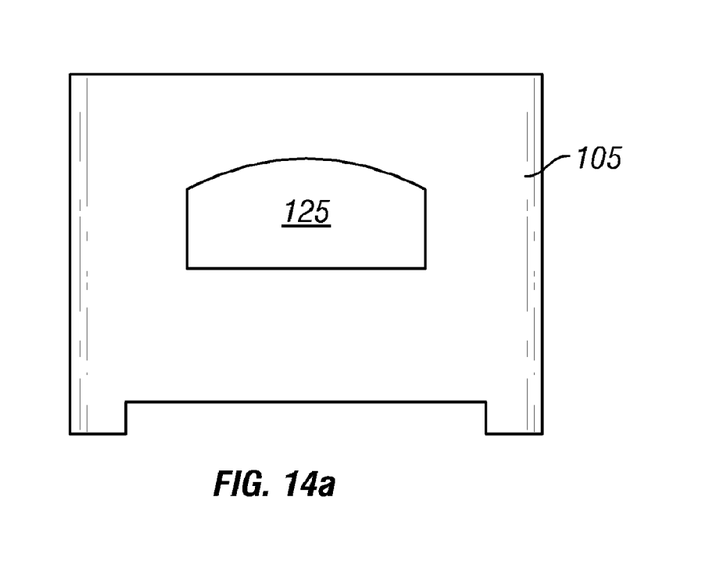
FIG. 14(a) illustrates an embodiment of a side of the outer covering.
Figure 14B:
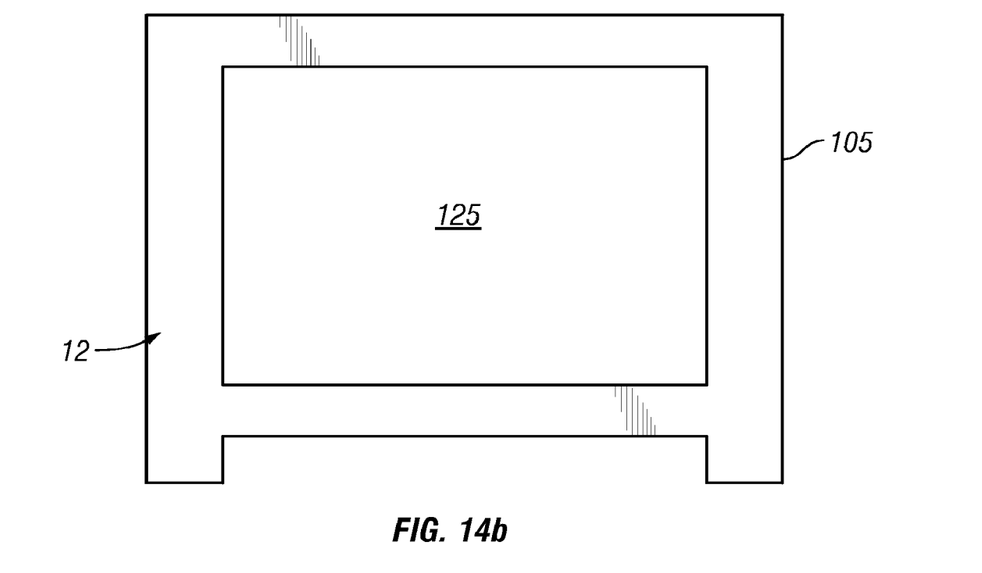
FIG. 14(b) illustrates an embodiment of a side of the outer covering.
Figure 16:
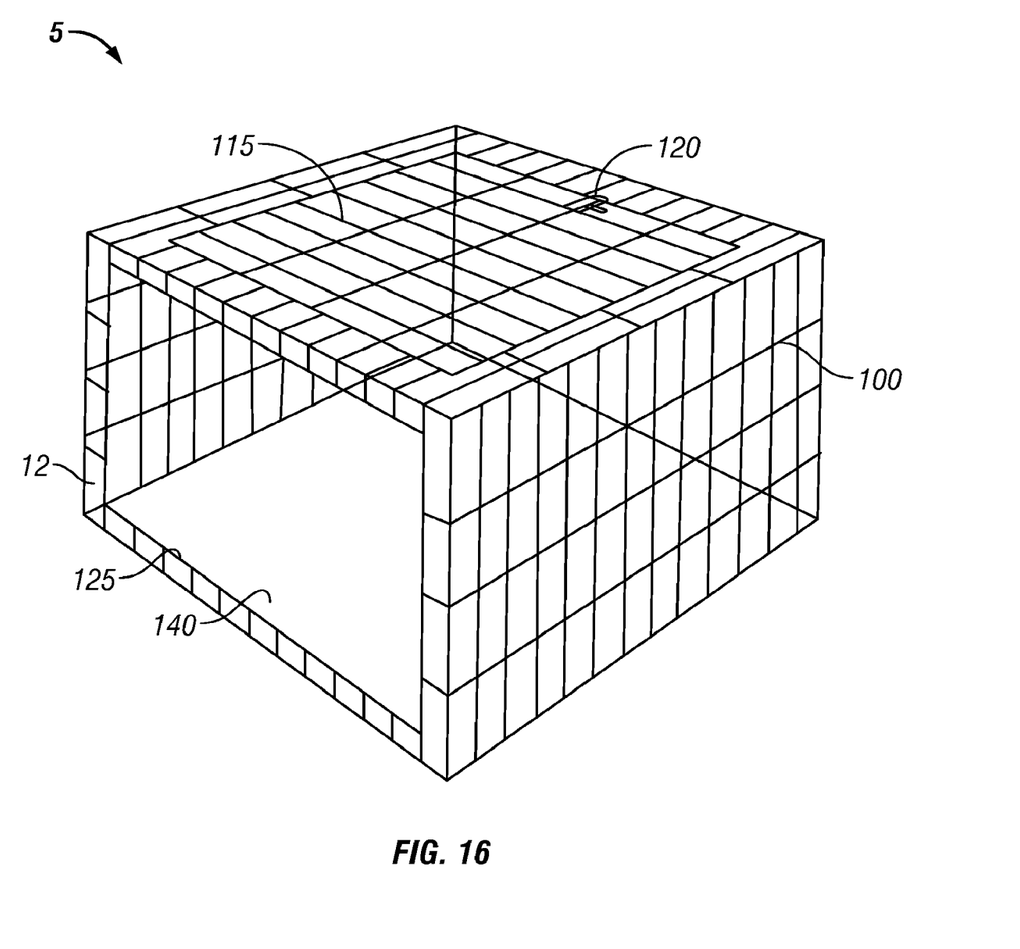
FIG. 16 illustrates a multiple function animal furniture piece comprising a cage.
Figure 17:
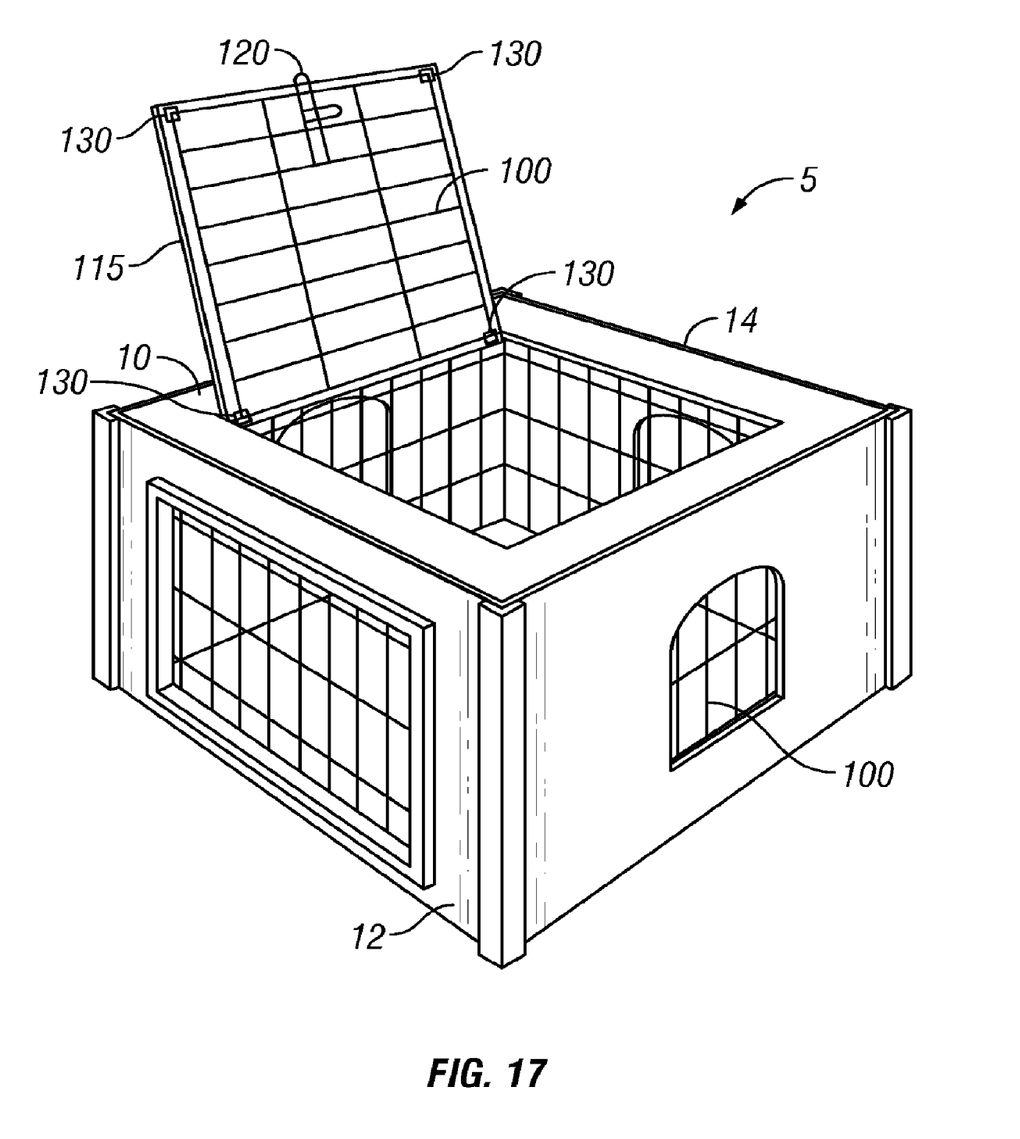
FIG. 17 illustrates an embodiment of the multiple function animal furniture piece of FIG. 13 with a door in an open position.

In an embodiment, multiple function animal furniture piece 5 comprises a cage and a outer covering on the top side 10, back side 14, front side 12, and sides 16, 18 of the cage (e.g., on all sides of the cage). In an alternative embodiment, multiple function animal furniture piece 5 also comprises an outer covering on bottom side (e.g., floor 20). FIG. 13 illustrates a front view of such an embodiment showing front side 12 and top side 10. In such an embodiment, multiple function animal furniture piece 5 comprises a cage 100 and an outer covering 105. Cage 100 may comprise any suitable material for containing an animal. For instance, cage 100 may comprise metal, wood, plastic, ceramic, and the like. The sides of cage 100 may be attached by any suitable means. In an embodiment, top side 10 has a door 115 that is movably openable and closable. Door 115 comprises a latching mechanism 120 by which door 115 may be secured to top side 10 and substantially prevented from movement. Latching mechanism 120 may comprise any suitable mechanism for opening and closing door 115 and also suitable for securing door 115 against movement relative to top side 10. It is to be understood that FIG. 13 shows door 115 in a closed position. FIG. 17 illustrates an embodiment in which door 115 is in an open position. As shown in FIG. 13, outer covering 105 on front side 12 has opening 125 by which cage 100 is exposed therethrough. In an embodiment, at least one side of outer covering 105 has an opening; alternatively front side 12, sides 16, 18, and back side 14 of outer covering 105 has such openings; and alternatively all sides of outer covering 105 have an opening. FIGS. 14(a) and 14(b) show embodiments of sides of outer covering 105 having different opening configurations. For instance, FIG. 14(a) illustrates outer covering 105 having opening 125 therethrough. Outer covering 105 having such opening 125 may be suitable as side 16, side 18, and/or back side 14. It is to be understood that outer covering 105 may have more than one opening 125. Opening 125 may have any desirable shape and size. FIG. 14(b) illustrates an embodiment of front side 12 having outer covering 105 with opening 125. In such an embodiment, opening 125 may be of sufficient size to allow a desirable animal to pass therethrough. Further referring to FIG. 13, in an alternative embodiment, front side 12 of cage 100 may be movably attached to side 16 or 18 of cage 100. In such an embodiment, such front side 12 of cage 100 may be sufficiently movable to allow a desirable animal to pass through opening 125 in such front side 12. In such an alternative embodiment, such front side 12 of cage 100 may also be sufficiently closable to prevent the desirable animal from passing through opening 125 in front side 12. In an alternative embodiment (not illustrated), another side is openable to allow a desirable animal to pass through an opening 125 therein into multiple functional animal furniture piece 5. In such an alternative embodiment, top side 10 may or may not be openable. For instance, FIG. 16 illustrates an embodiment of multiple functional animal furniture piece 5 comprising a cage 100 and no outer covering 105. As shown in FIG. 16, front side 12 has movably attached door 115 with a latching mechanism 120. It is to be understood that FIG. 16 shows door 115 in the open position and disposed on top of top side 12 thereby providing opening 125 in cage 100.

It is to be understood that outer covering 105 may be secured to cage 100 or not secured to cage 100. In an embodiment in which outer covering 105 is secured to cage 100, outer covering 105 may be secured by any suitable method. For instance, outer covering 105 may be secured to cage 100 by one or more grooves 106 in outer covering 105 as best seem in FIG. 15a. As an example, portions of cage 100 may be suitably secured into a groove 106 disposed in outer covering 105.

Figure 15:
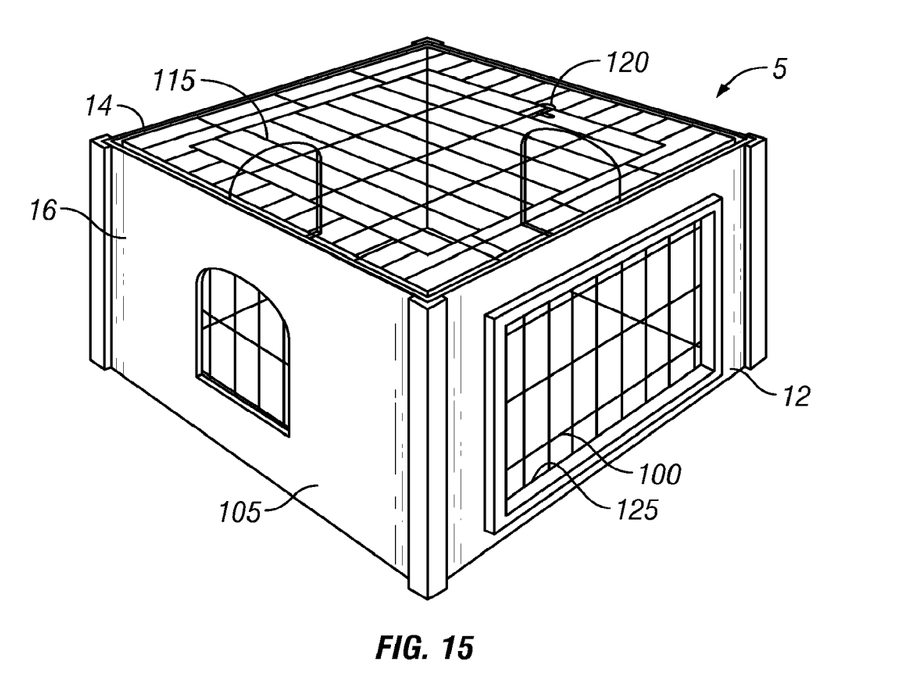
FIG. 15 illustrates an embodiment showing a cage and an outer covering with the top side of the outer covering removed.
Figure 15A:
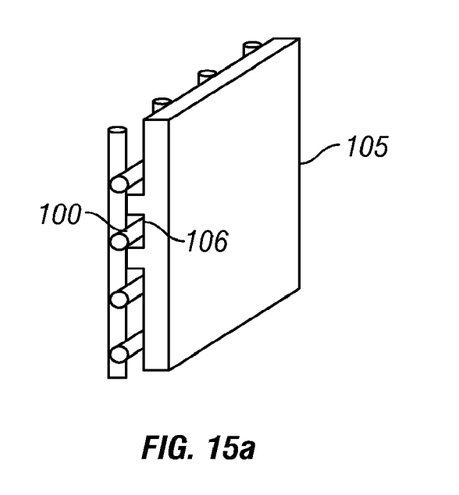
FIG. 15a illustrates an embodiment of a side sectional view of the outer covering secured to a cage by a groove.

FIG. 15 illustrates an embodiment of FIG. 13 with the outer covering 105 of top side 10 removed to expose top side 10 of cage 100. As shown, door 115 has latching mechanism 120.

The sides of outer covering 105 may be attached by any suitable method. For instance, the sides may be connected by magnets, glue, hooks, and the like. In an embodiment, the sides are connected by magnets. Each side of outer covering 105 may have any number of magnets suitable to sufficiently secure one such side to another such side (e.g., by magnetic attraction to another side). The magnets may be secured to the exterior of the outer covering 105 (e.g., by glue) and/or may be embedded in the outer covering 105. It is to be understood that each side of outer covering 105 may be separated from another side by applying sufficient force to overcome the force of the magnet. Thereby, one or more sides of outer covering 105 may be removed to expose cage 100. FIG. 16 illustrates an embodiment in which all sides of outer covering 105 have been removed. In an alternative embodiment, magnets disposed on the outer covering 105 may also be used to secure outer covering 105 to cage 100. For instance, FIG. 17 illustrates an embodiment in which magnets 130 on the outer covering 105 of door 115 secure such outer covering 105 of door 115 to the cage portion 105 of door 115. As shown in FIG. 16, multiple function animal furniture system 5 may also comprise a detachable mat 140.

As mentioned, the structure and system of the multiple function animal furniture piece 5 provides the owner of an animal with the versatile means for providing care for the animal. This structure and system may accommodate activities for animals of all ages and sizes. The structure serves as both a dwelling for small animals as well as a training cage to teach certain behaviors. In addition, an internal storage capacity is provided. The ability to store the detachable components of the system within the structure facilitates managing this system. The portability of the structure enables the owner to position it at any location. As mentioned, owners may use it as a bed for the animal or as a means for the animal to climb into the owner's bed. The attachable ramp may also facilitate animals of all ages and sizes in climbing the ramp to the top side of the structure. At the animal's death, the structure may serve as a container coffin in which to bury the animal.

It is to be understood that sides 12, 14, 16, and 18 are for illustration and explanatory purposes and embodiments described for one of such particular sides may be suitable for one or more other of such sides.

Figure 18:
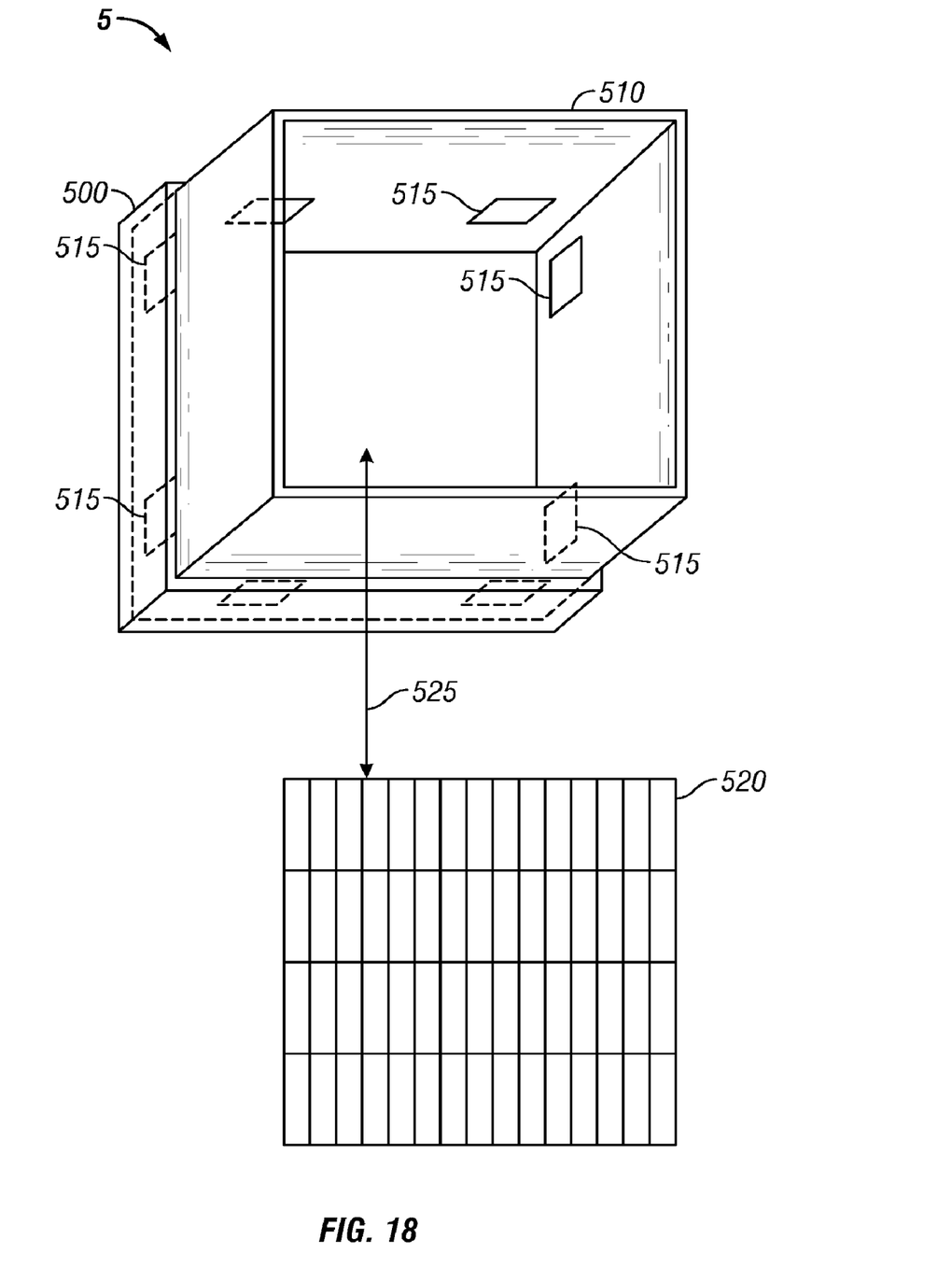
FIG. 18 illustrates an embodiment of the multiple function animal furniture piece having a base and a grate.

FIG. 18 illustrates an embodiment in which multiple function animal furniture piece 5 comprises a base 500 and an outer covering 510. Cage 100 is not shown for illustration purposes. Base 500 comprises any material suitable for use with an animal cage. Without limitation, examples of suitable materials include plastic, ceramic, stainless steel, and the like. Preferable materials include plastic. Base 500 preferably comprises a similar configuration to that of outer covering 510. In addition, base 500 has a width and length suitable for outer covering 510 to be disposed inside of base 500. Preferably, outer covering 510 is disposed within sufficient proximity to base 500 for magnets 515 disposed within base 500 and/or outer covering 510 to provide a desirable stability (e.g., lateral and vertical stability) to outer covering 510. Base 500 may comprise any height suitable for providing strength and integrity to outer covering 510. In an embodiment, the height of base 500 is less than the height of outer covering 510.

Figure 18A:
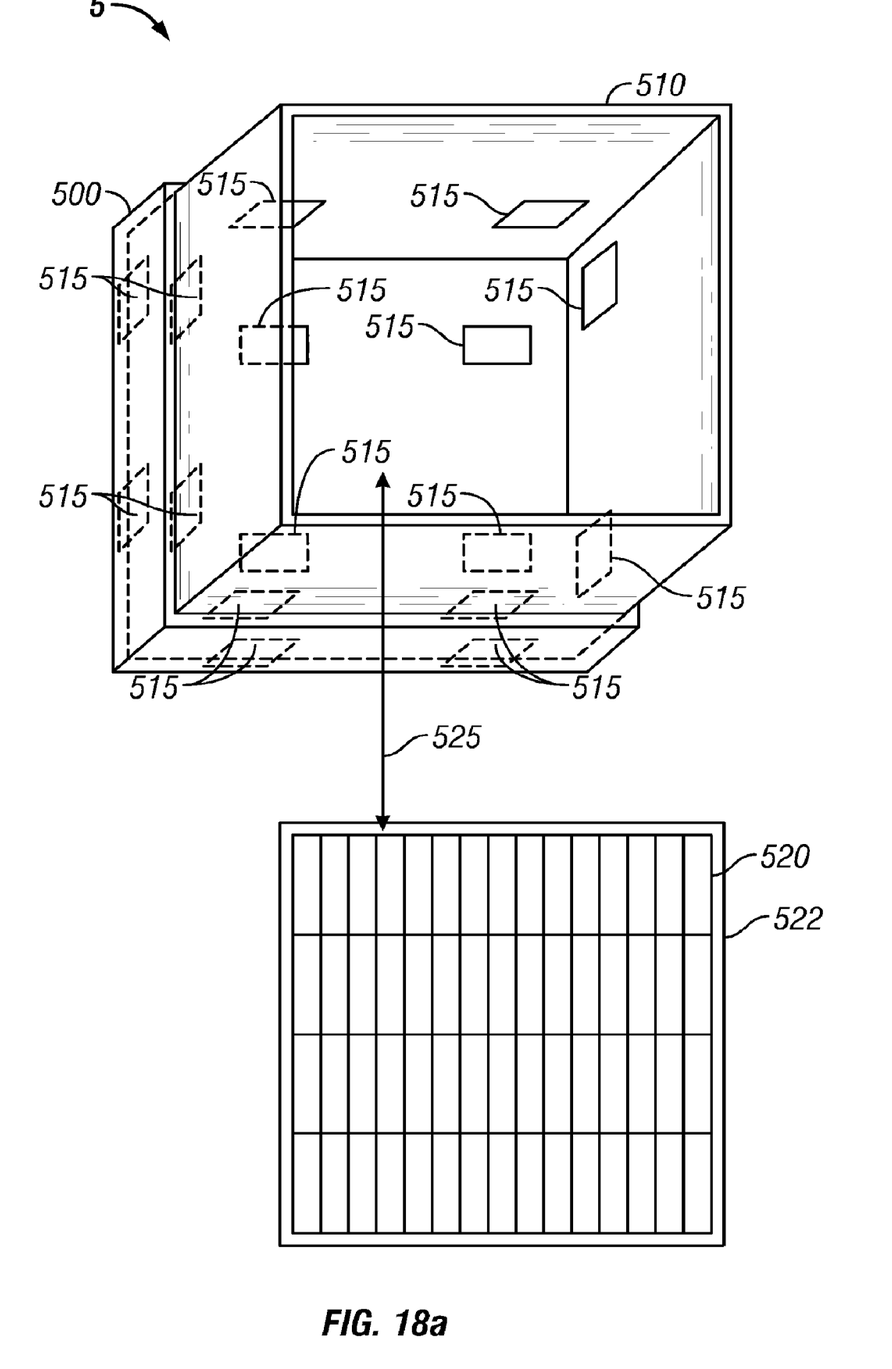
FIG. 18a illustrates an embodiment of the multiple function animal furniture piece wherein the base comprises magnets.

As shown in FIG. 18, outer covering 510 comprises magnets 515. In alternative embodiments, base 500 and/or outer covering 510 comprise magnets 515. Magnets 515 may be attached to base 500 and/or outer covering 510 and/or may be embedded in base 500 (see FIG. 18a and 21a) and/or outer covering 510. In such an embodiment, multiple function animal furniture piece 5 may comprise any desired number and type of magnets. In an embodiment (not illustrated), magnets 515 are disposed in base 500. In such an embodiment, metal (or like material that is attractive to a magnetic force) may be attached to outer covering 510 in sufficient locations that when outer covering 510 is placed in base 500, the magnets 515 secure outer covering 510 to base 500. The metal may be attached to outer covering 510 by any suitable means such as by glue. For instance, the metal may be disposed in locations on outer covering 510 that correspond to locations on base 500. The magnets 515 also may serve to laterally and vertically secure cage 100.

As further shown in FIG. 18, multiple function animal furniture piece 5 may also comprise a grate 520. Grate 520 comprises any suitable grate-like shape and configuration. Without limitation, grate 520 comprises openings of a sufficient diameter to allow animal waste to fall through grate 520. In another embodiment see in FIG. 18a and 21a, a pan 522 is disposed beneath grate 520. Pan 522 may be comprised of any suitable material. Without being limited by theory, animal waste that falls through grate 520 is captured by pan 522. Grate 520 and pan 522 are slidably insertable into base 500. Grate 520 and pan 522 may be inserted and removed from base 500 in the directions as illustrated by arrow 525. In an embodiment (not illustrated), grate 520 and pan 522 are inserted into base 500 through an opening in base 500.

Figure 19:
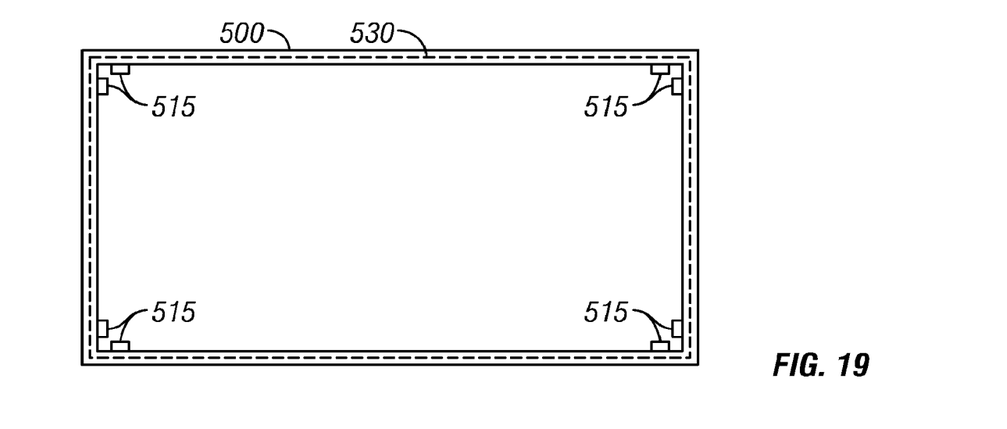
FIG. 19 illustrates a top view of an embodiment of the multiple function animal furniture piece having a base.
Figure 20:
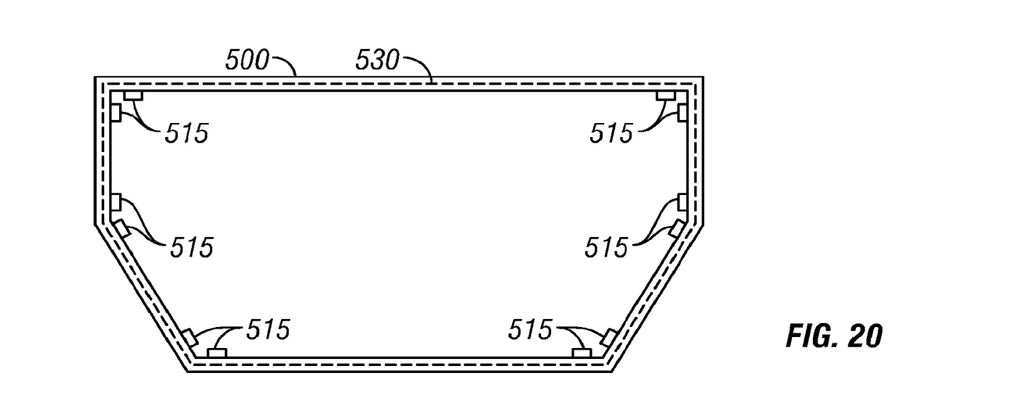
FIG. 20 illustrates a top view of an alternate configuration of an embodiment of the multiple function animal furniture piece having a base.

FIG. 19 illustrates a top view of an embodiment of base 500. In such an embodiment, base 500 comprises a plurality of drain holes 530. Without being limited by theory, drain holes 530 allow fluid such as water to pass into the pan. FIG. 20 illustrates an embodiment of base 500 having a different configuration than that shown in FIG. 19.

Figure 21:
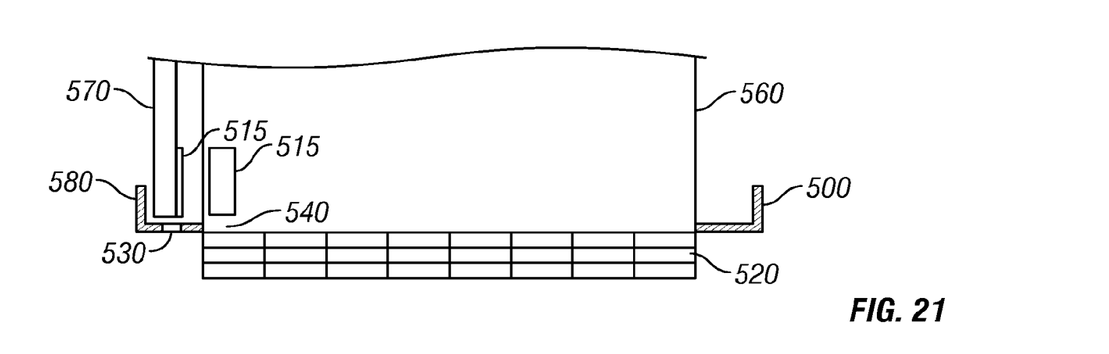
FIG. 21 illustrates a cross sectional side view of the multiple function animal furniture piece having a base and a cage.
Figure 21A:
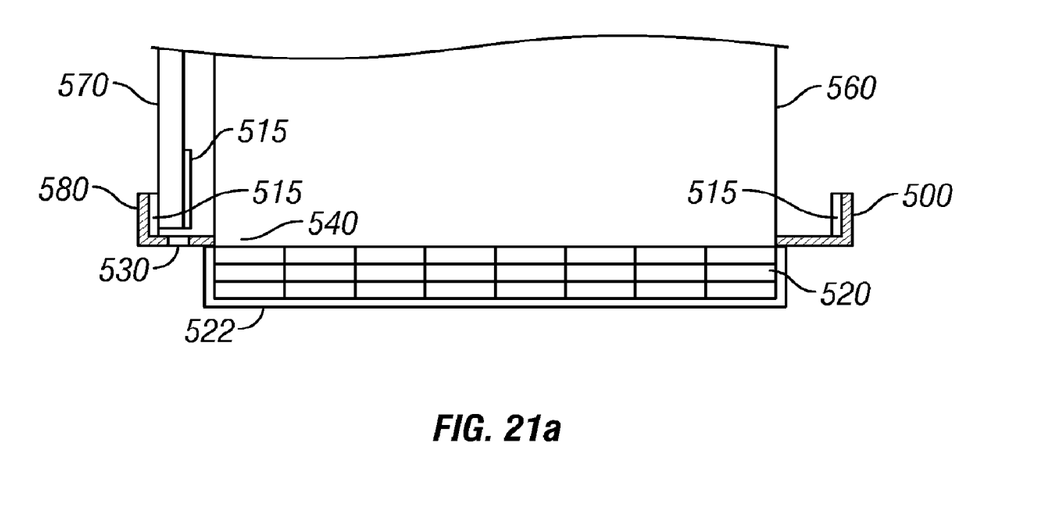
FIG. 21a illustrates an embodiment of a cross sectional side view of the multiple function animal furniture piece wherein the base comprises magnets.

FIG. 21 illustrates a cross sectional side view of an embodiment of base 500 having a lip 580. In such an embodiment, lip 580 provides a cavity 540 in which grate 520 may be inserted. For instance, lip 580 comprises a raised portion of base 500. The walls 570 and corners 560 of base 500 are disposed upon lip 580, which provides cavity 540 for insertion of grate 520. In such an embodiment, the pan is disposed beneath grate 520, which provides spacing in cavity 540 between the grate 520 and the pan. Lip 580 may also comprise one or more drain holes 530. As further illustrated, magnets 515 may disposed on corner 560 and wall 570.

Although the present invention and its advantages have been described in detail, it should be understood that various changes, substitutions and alterations may be made herein without departing from the spirit and scope of the invention as defined by the appended claims.

What is claimed is:

1. An animal housing, comprising:
   a cage;
   an outer covering comprising a plurality of outer covering sides, wherein the outer covering comprises a first outer covering side secured to a second outer covering side by a magnet; and
   a base, wherein the base comprises a plurality of base magnets, wherein the plurality of base magnets secure the cage and the outer covering to the base.

2. The animal housing of claim 1, wherein at least one of the outer covering sides comprises an opening comprising a character shape.

3. The animal housing of claim 2, wherein the at least one of the outer covering sides comprises more than one opening.

4. The animal housing of claim 2, wherein the character shape comprises an animal shape, a cartoon figure shape, a toy shape, a letter shape, a number shape, or a symbol shape.

5. The animal housing of claim 1, wherein the plurality of base magnets secure the outer covering to the base.

6. The animal housing of claim 1, further comprising a grate.

7. The animal housing of claim 6, further comprising a pan.

8. The animal housing of claim 7, wherein the grate and the pan are insertable and removeable from the base.

9. The animal housing of claim 1, wherein the base further comprises a lip, and wherein the lip provides a cavity in the base.

10. The animal housing of claim 9, wherein a grate and a pan are insertable into the cavity.

11. The animal housing of claim 1, wherein the base comprises a drain hole.

12. The animal housing of claim 1, wherein the cage comprises, metal, wood, ceramic, or plastic.

13. The animal housing of claim 1, wherein the cage comprises metal.

14. The animal housing of claim 1, wherein the outer covering is secured to the cage.

15. The animal housing of claim 14, wherein the outer covering is secured to the cage by at least one magnet.

16. The animal housing of claim 14, wherein the outer covering is secured to the cage by at least one groove.

17. The animal housing of claim 1, wherein the outer covering comprises natural or synthetic wood, veneer, vinyl, wicker, plastic, or ceramic.

18. The animal housing of claim 1, wherein the outer covering comprises wood.

\* \* \* \* \*